US012749274B2

(12) United States Patent
Garcia Delgado et al.

(10) Patent No.: US 12,749,274 B2
(45) Date of Patent: Sep. 29, 2026

(54) COMPUTER-BASED PERSONALIZATION OF A VIRTUAL WORLD COLLABORATION ENVIRONMENT

(71) Applicant: International Business Machines Corporation, Armonk, NY (US)

(72) Inventors: Carolina Garcia Delgado, Zapopan (MX); Randy A. Rendahl, Raleigh, NC (US); Sarbajit K. Rakshit, Kolkata (IN); Tushar Agrawal, West Fargo, ND (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 18/410,093

(22) Filed: Jan. 11, 2024

(65) Prior Publication Data

US 2025/0232540 A1 Jul. 17, 2025

(51) Int. Cl.
*G06T 19/20* (2011.01)
*G06T 7/70* (2017.01)
(Continued)

(52) U.S. Cl.
CPC ................ *G06T 19/20* (2013.01); *G06T 7/70* (2017.01); *G06T 13/205* (2013.01); *G06T 13/40* (2013.01);
(Continued)

(58) Field of Classification Search
CPC ......... G06T 19/20; G06T 7/70; G06T 13/205; G06T 13/40; G06T 2219/2004; G06V 10/44; G06V 40/174; G06V 40/20
See application file for complete search history.

(56) References Cited

U.S. PATENT DOCUMENTS 7,574,332 B2 8/2009 Ballin
9,908,046 B2 3/2018 Dawson
(Continued)

FOREIGN PATENT DOCUMENTS

CN 116132133 A 5/2023
WO 2023048417 A1 3/2023

OTHER PUBLICATIONS

Randhavane et al. "Identifying Emotions from Walking Using Affective and Deep Features", arXiv:1906. 11884v4, Jan. 2020 (Year: 2020).*
(Continued)

*Primary Examiner* — Kee M Tung
*Assistant Examiner* — Xiaoming Wei
(74) *Attorney, Agent, or Firm* — Joseph P. Curcuru

(57) ABSTRACT

In an approach to improve computer-based virtual world collaboration environments, embodiments of the present invention identifies, by a client computer, a structure of a virtual world collaboration room and the placement of participants in the virtual world collaboration room, and correlates, by an internet of things (IoT) sensor set, body language of an avatar to match a spoken context of the avatar. Further, embodiments select personalized virtual world collaboration room or a predetermined physical location to conduct a virtual world collaboration and utilize a generative adversarial network (GAN) to adapt the avatar to the personalized virtual world collaborative environment. Additionally, embodiments perform real-time adaptation, by the GAN, of participating avatars to generate and output a required body language for the participating avatars based on their location different personalized virtual world collaboration rooms.

20 Claims, 4 Drawing Sheets

(51) Int. Cl.

| | |
|---|---|
| ***G06T 13/20*** | (2011.01) |
| ***G06T 13/40*** | (2011.01) |
| ***G06V 10/44*** | (2022.01) |
| ***G06V 40/16*** | (2022.01) |
| ***G06V 40/20*** | (2022.01) |

(52) U.S. Cl.

CPC ............ *G06V 10/44* (2022.01); *G06V 40/174* (2022.01); *G06V 40/20* (2022.01); *G06T 2219/2004* (2013.01)

(56) References Cited

U.S. PATENT DOCUMENTS

| | | | | |
|---|---|---|---|---|
| 11,893,152 | B1 * | 2/2024 | Ezrielev | G06V 10/774 |
| 2009/0175559 | A1 | 7/2009 | Hamilton, II | |
| 2012/0131478 | A1 * | 5/2012 | Maor | G06T 19/20<br>715/757 |
| 2015/0296134 | A1 | 10/2015 | Cudak | |
| 2022/0083125 | A1 * | 3/2022 | Lefaudeux | G06F 3/011 |
| 2022/0242450 | A1 | 8/2022 | Sokolov | |
| 2023/0013828 | A1 | 1/2023 | Rakshit | |
| 2023/0109377 | A1 | 4/2023 | Arechiga | |
| 2023/0154126 | A1 | 5/2023 | Sathya | |
| 2023/0410398 | A1 * | 12/2023 | Song | G06T 7/246 |
| 2024/0070951 | A1 * | 2/2024 | Tiwari | G06N 20/00 |

OTHER PUBLICATIONS

Andrea Kleinsmith and Nadia Bianchi-Berthouze, "Affective Body Expression Perception and Recognition: A Survey", IEEE Transactions on Affective Computing, vol. 4, No. 1, Jan.-Mar. 2013 (Year: 2013).*

"An innovative approach to digital collaboration," Sep. 14, 2020, 5 pages. https://www.ibm.com/thought-leadership/institute-business-value/report/digital-collaboration-speed-relevance.

"Metaverse Market is estimated to be US$ 947.118 billion by 2023 with a CAGR of 38.8% during the forecase period," Apr. 25, 2022, 9 pages. https://www.globenewswire.com/news-release/2022/04/25/2428281/0/en/Metaverse-Market-is-estimated-to-be-US-947-118-billion-by-2030-with-a-CAGR-of-38-8-during-the-forecast-period-By-PMI.html.

"Virtual Meetings In Metaverse: The Future of Work and Events," Jan. 18, 2023, 8 pages. https://www.pandamr.com/blog/virtual-meetings-in-metaverse-the-future-of-work-and-events.

M. Rebol et al., "Passing a Non-verbal Turing Test: Evaluating Gesture Animations Generated from Speech," Submitted on Jul. 1, 2021 (v1), last revised Aug. 21, 2021 (this version, v2)], https://arxiv.org/abs/2107.00712.

Marmpena, A., "Emotional body language synthesis for humanoid robots," PhD diss., University of Plymouth, 2021.

* cited by examiner

COMPUTER-BASED PERSONALIZATION OF A VIRTUAL WORLD COLLABORATION ENVIRONMENT

BACKGROUND OF THE INVENTION

The present invention relates generally to virtual world environments, and more particularly to the field of computer-based virtual world collaboration.

A virtual world (also referred to as a virtual space) is a computer-simulated environment which may be populated by many users who can create a personal avatar, and simultaneously and independently explore the virtual world, participate in its activities, and communicate with others. These avatars can be textual, graphical representations, or live video avatars with auditory and touch sensations. Virtual worlds are closely related to mirror worlds. In a virtual world, the user accesses a computer-simulated world which presents perceptual stimuli to the user, who in turn can manipulate elements of the modelled world and thus experience a degree of presence. Such modelled worlds and their rules may draw from reality or fantasy worlds. Example rules are gravity, topography, locomotion, real-time actions, and communication. Communication between users can range from text, graphical icons, visual gesture, sound, and rarely, forms using touch, voice command, and balance senses.

Virtual collaboration is the method of collaboration between virtual team members that is carried out via technology-mediated communication. Virtual collaboration follows the same process as collaboration, but the parties involved in virtual collaboration do not physically interact and communicate exclusively through technological channels. Distributed teams use virtual collaboration to simulate the information transfer present in face-to-face meetings, communicating virtually through verbal, visual, written, and digital means. Virtual collaboration is commonly used by globally distributed business and scientific teams. Ideally, virtual collaboration is most effective when it can simulate face-to-face interaction between team members through the transfer of contextual information, but technological limits in sharing certain types of information prevent virtual collaboration from being as effective as face-to-face interaction.

SUMMARY

Embodiments of the present invention disclose a computer-implemented method, a computer program product, and a system, for improve computer-based virtual world collaboration environments, the computer-implemented method comprising: identifying, by a client computer, a structure of a virtual world collaboration room and the placement of participants in the virtual world collaboration room; correlating, by an internet of things (IoT) sensor set, body language of an avatar to match a spoken context of the avatar; selecting personalized virtual world collaboration room or a predetermined physical location to conduct a virtual world collaboration; utilizing a generative adversarial network (GAN) to adapt the avatar to the personalized virtual world collaborative environment; and performing real-time adaptation, by the GAN, of participating avatars to generate and output a required body language for the participating avatars based on their location different personalized virtual world collaboration rooms.

DETAILED DESCRIPTION

Figure 1A:
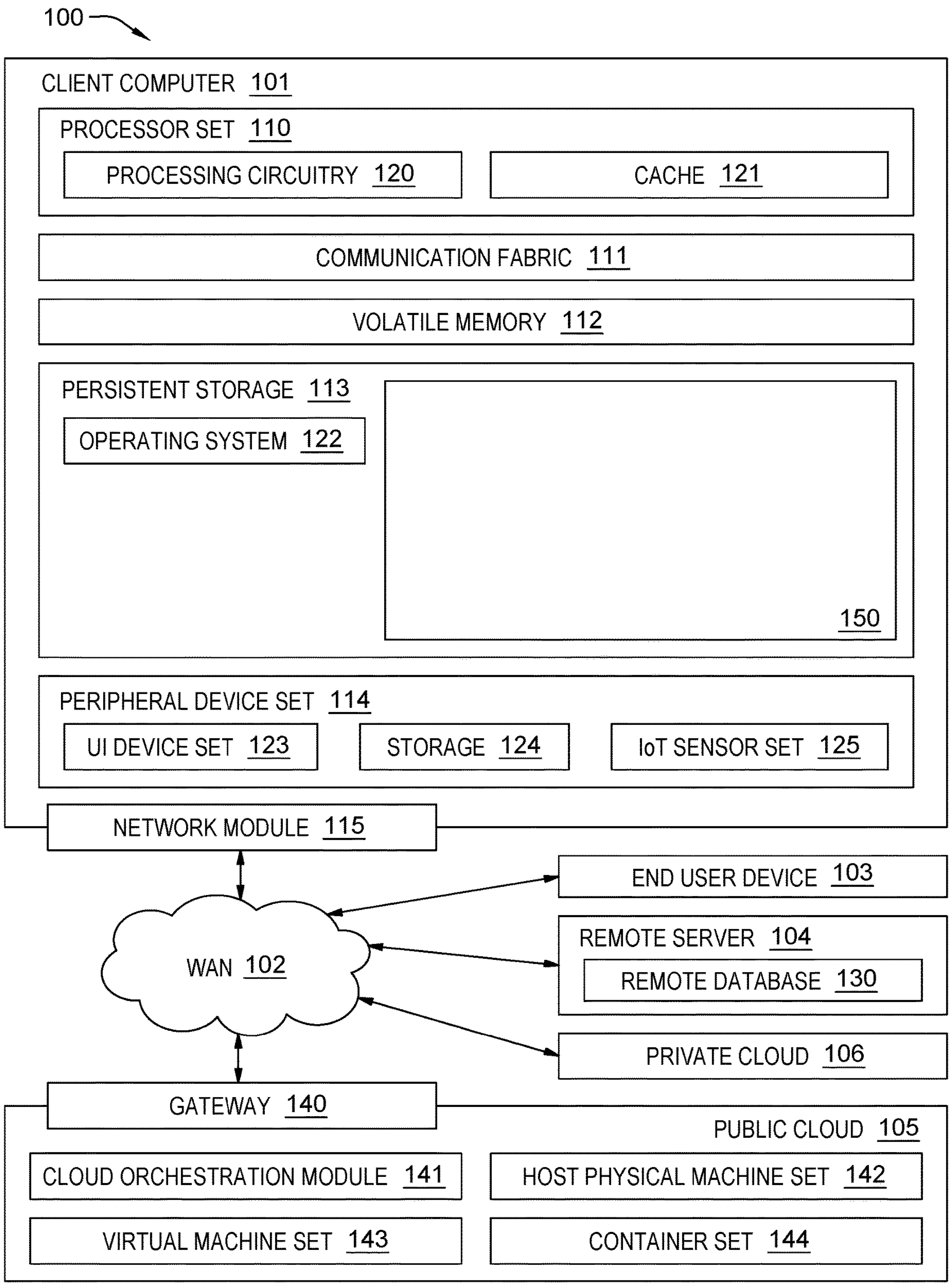
FIG. 1A is a functional block diagram illustrating a distributed data processing environment, executing a virtual world collaboration environment program, in accordance with an embodiment of the present invention.

Embodiments of the present invention recognize that virtual world collaboration offers a transformative way for individuals and teams to connect, interact, and collaborate in virtual environments. By leveraging advanced technologies, such as virtual reality (VR) and augmented reality (AR), participants can engage in shared immersive experiences regardless of their physical location. Embodiments of the present invention recognize that, in virtual world collaboration, users can gather in virtual spaces, represented by customizable avatars, and collaborate in real-time, simulating face-to-face interactions. Embodiments of the present invention recognize that users can communicate through voice, gestures, and even shared virtual objects, enabling a more natural and engaging collaboration experience. Embodiments of the present invention recognize that with the ability to create and personalize virtual world collaboration rooms, participants can choose environments that suit their needs, whether it's a virtual boardroom, a creative studio, or a casual meeting space. Embodiments of the present invention recognize that this flexibility allows for dynamic and tailored collaboration experiences that can enhance productivity, creativity, and teamwork.

Embodiments of the present invention recognize that virtual world collaboration are transcends physical boundaries, enabling individuals from different locations to collaborate seamlessly, which eliminates the limitations of traditional geographical constraints and allows for a more inclusive and diverse collaboration environment. Embodiments of the present invention recognize that virtual world collaboration fosters a sense of presence and immersion, which can lead to increased engagement and participation. Embodiments of the present invention recognize that participants can feel as if they are truly present in the virtual space, enhancing their focus and interaction with others. Further, embodiments of the present invention recognize that the customizable nature of virtual world collaboration rooms allows for personalized experiences that cater to specific needs and preferences. Embodiments of the present invention recognize that participants can create virtual environments that reflect their work style, promote creativity, or facilitate specific types of collaboration.

Embodiments of the present invention recognize that in any virtual world collaboration, a virtual world collaboration room is chosen, and participants can see each other within this designated room. The avatars representing the participants are positioned within the virtual world collaboration room. In this situation, embodiments of the present invention recognize that certain participants may prefer to engage in the virtual world collaboration room based on their personalized preferences and the arrangement of participants within the allocated space of the customized virtual world collaboration room. Thus, there is a need to improve interaction between users in a virtual environment and improve the efficiency of user interaction within the virtual environment.

Embodiments of the present invention improve the art, and solve at least the particular problems stated above, by (i) identifying a structure of a metaverse collaboration room and the placement of participants in the metaverse collaboration room, (ii) identifying a selected physical location for the metaverse collaboration, (iii) correlating body language of an avatar to match a spoken context of the avatar, (iv) selecting personalized metaverse collaboration room or a predetermined physical location to conduct a metaverse collaboration, wherein the metaverse collaboration room is personalized, (v) utilizing a generative adversarial network (GAN) to adapt the avatar to the personalized metaverse collaborative environment, and (vi) performing real-time adaptation of participating avatars to generate and output a required body language for the participating avatars based on their location different personalized metaverse collaboration rooms.

Implementation of embodiments of the invention may take a variety of forms, and exemplary implementation details are discussed subsequently with reference to the Figures (i.e., FIG. 1A-FIG. 3).

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails, and texts, and/or responsive display prompts begin with a written notification that the user's information may be recorded or monitored and may be saved, for the purpose of consolidating shipments to reduce carbon emissions and shipping costs. These embodiments may also include periodic reminders of such recording and monitoring throughout the course of any such use. Certain embodiments may also include regular (e.g., daily, weekly, monthly) reminders to the participating parties that they have consented to being recorded and monitored for collision avoidance and autonomous vehicle safety measures and may provide the participating parties with the opportunity to opt-out of such recording and monitoring if desired.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as virtual world collaboration environment program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. IoT sensor set 125 may be any combination of proximity sensors, image sensor, motion sensor, thermistor, capacity sensing, photoelectric sensor, infrared sensor, level sensor, humidity sensor, pressure sensor, temperature sensor, and/or any sensor and/or IoT sensor known and understood in the art.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In various embodiments, each participating user has the option to select their preferred virtual world collaboration room based on predetermined and/or customized choices. Component 150 may facilitate, manage, and/or execute the preferred virtual world collaboration room and the predetermined and/or customized choices. Component 150 may adjust the relative positions of the participants within the same personalized virtual world collaboration room. In various embodiments, component 150 adjusts the relative positions of the participants within the same personalized virtual world collaboration room based on received and/or retrieved feedback and/or preferences from one or more users. In various embodiments, the personalized virtual world collaboration room can represent a physical environment where the participants are virtually overlaid over the physical environment or can be any chosen virtual world collaboration room selected from a predetermined list and/or customized room.

In various embodiments, based on the context of the virtual world collaboration and the spoken content of each participant, component 150 identifies the appropriate types of body language to accompany the spoken interaction within the virtual world. Depending on the selected virtual world room and physical location, component 150 dynamically adapts the avatars of each participant to align with the respective virtual world collaboration room or physical place associated with each participant. For example, a first participant selects a virtual world boardroom, the second participant selects a visiting place where participants will be standing, and a third participant has opted for their own living room for the virtual world collaboration. In this example, component 150 will dynamically adjust the virtual collaboration environment and participating avatars to match the selected virtual collaboration of each participant. Meaning there will be three virtual displays that are customized for each user.

In various embodiments, based on the selected types of virtual world collaboration room, any selected physical place for the virtual world collaboration, component 150 recommends how the participants can be arranged in the virtual world collaboration, and at the same time received input from one or more participants, wherein the input is a definition and/or preferences on how other participants will be occupying the virtual space (e.g., collaboration room). In various embodiments, component 150 analyzes the selected virtual world collaboration room by individual users, and identifies the types of sitting or standing posture in different places of the avatars, and accordingly component 150 utilizes a generative adversarial network (GAN) to modify the appearance of each of the avatar for each of the participant's virtual world collaboration room. In various embodiments, component 150 utilizes GAN to modify the appearance of each of the avatar for each of the participant's virtual world collaboration room based on each user's physical location and current movements.

In various embodiments, while creating the avatar of each of the participants on different selected virtual world environment (e.g., collaboration room, virtual representation of a physical place, etc.), component 150 identifies which portions of the avatar's body does not have to show any body language and which portion of the avatar body needs to show the body language, and executes GAN on local devices of every individual participant to manipulate the respective avatar so that a user only observes the portion of the avatar that is required to show the body language. In various embodiments, if any participant selects any physical place for virtual world collaboration, then component 150 identifies the number of seating places that are available in the physical place and determines if additional sitting places will be required based on the identified number of participants or anticipated participants. Component 150 may enable a set of participants to occupy the available physical seating while the remining participants will be placed on virtually created seating placed in the metaverse collaboration. For example, the physical room seats eight people; however, fifteen people are participating in the collaboration event. In this example, eight participants will sit in the physical room while seven participants will be virtually rendered in virtual seats in the physical room. In various embodiments, component 150 creates a mixed reality environment. In other embodiments, component 150 creates and/or facilitates a virtual world environment.

In various embodiments, component 150 identifies, by client computer 101, a structure of a virtual world collaboration room and a placement of participants in the virtual world collaboration room, correlates, by IoT sensor set 125, body language of an avatar to match a spoken context of the avatar, selects the virtual world collaboration room or a predetermined physical location to conduct a virtual world collaboration, wherein the virtual world collaboration room is personalized, utilizes a generative adversarial network (GAN) to adapt the avatar to the virtual world collaborative environment, and perform real-time adaptation, by the GAN, of participating avatars to generate and output a required body language for the participating avatars based on movement of a user.

In various embodiments, component 150 identifies a physical location for the virtual world collaboration room has been selected, analyzes the selected virtual world collaboration room by individual users and the physical location, identifies a type of sitting or standing posture in different locations within the virtual world collaboration room for the participating avatars, and utilizing the GAN to modify the appearance of each of the participating avatars for each of virtual world collaboration room associated with the participants, and identifies portions of the avatars body that is not required to demonstrate the body language and portions of the avatar body required to emulate the body language.

In various embodiments, identifying the structure of the virtual world collaboration room and the placement of the participants in the virtual world collaboration room further comprises: analyzing a three-dimensional model of the virtual world collaboration room; identifying positions and placements of participants within the virtual world collaboration room based on hierarchy, seating arrangements, role of the participants, preferences, visibility, proximity, and accessibility for effective collaboration; identifying types of sitting and standing places in the virtual world collaborative room; and considering historical data on how different participates are occupying those sitting and standing places. In various embodiments, correlating of the body language of the avatar to match the spoken context of the avatar further comprises: creating an artificial intelligent (AI) model that correlates the body language of the avatar with the spoken context of the avatar based on historically gather information from different types of virtual world collaborations and body language performed by different participants, and gathering a dataset of historical data that includes body language features of the avatars and a corresponding spoken context or dialogue, wherein the data encompasses a range of scenarios and interactions, and wherein the includes body language features of the avatars comprises posture, gestures, and facial expressions.

In various embodiments, utilizing the GAN to adapt the avatar to the personalized virtual world collaborative environment further comprises: identifying a number of participants attending in one or more virtual world collaboration environments; displaying, by the GAN, the avatar sitting or standing in a selected personalized virtual world room; collecting datasets of participating avatars in various sitting and standing positions, and corresponding backgrounds or virtual world room settings, wherein the historical datasets are utilized to train a GAN model; and performing pre-process and prepare the dataset by cropping or isolating the avatars and their respective backgrounds. In various embodiments, component 150 annotates the collected datasets by linking features of the body language with the spoken context, and extracts relevant features from the annotated data, wherein the relevant features comprise position of limbs and overall body posture of the avatars, and wherein extracting comprises: utilizing computer vision techniques or pose estimation algorithms to capture data associated with the body language from representations from the avatar, and utilizing machine learning techniques to train an AI model that can correlate the extracted features of the body language with the spoken context. In various embodiments, component 150 trains the GAN model using the prepared dataset, wherein the GAN model comprises a generator network that generates synthetic avatars and a network that distinguishes between real and generated avatars, utilizes the trained GAN model to modify the pose of the avatar, fine-tunes the generated avatar image to ensure the avatar aligns with an assigned seating or standing position in the virtual world collaboration room, and implements real-time adaptation of the avatar based on user input or dynamic changes.

Figure 1B:
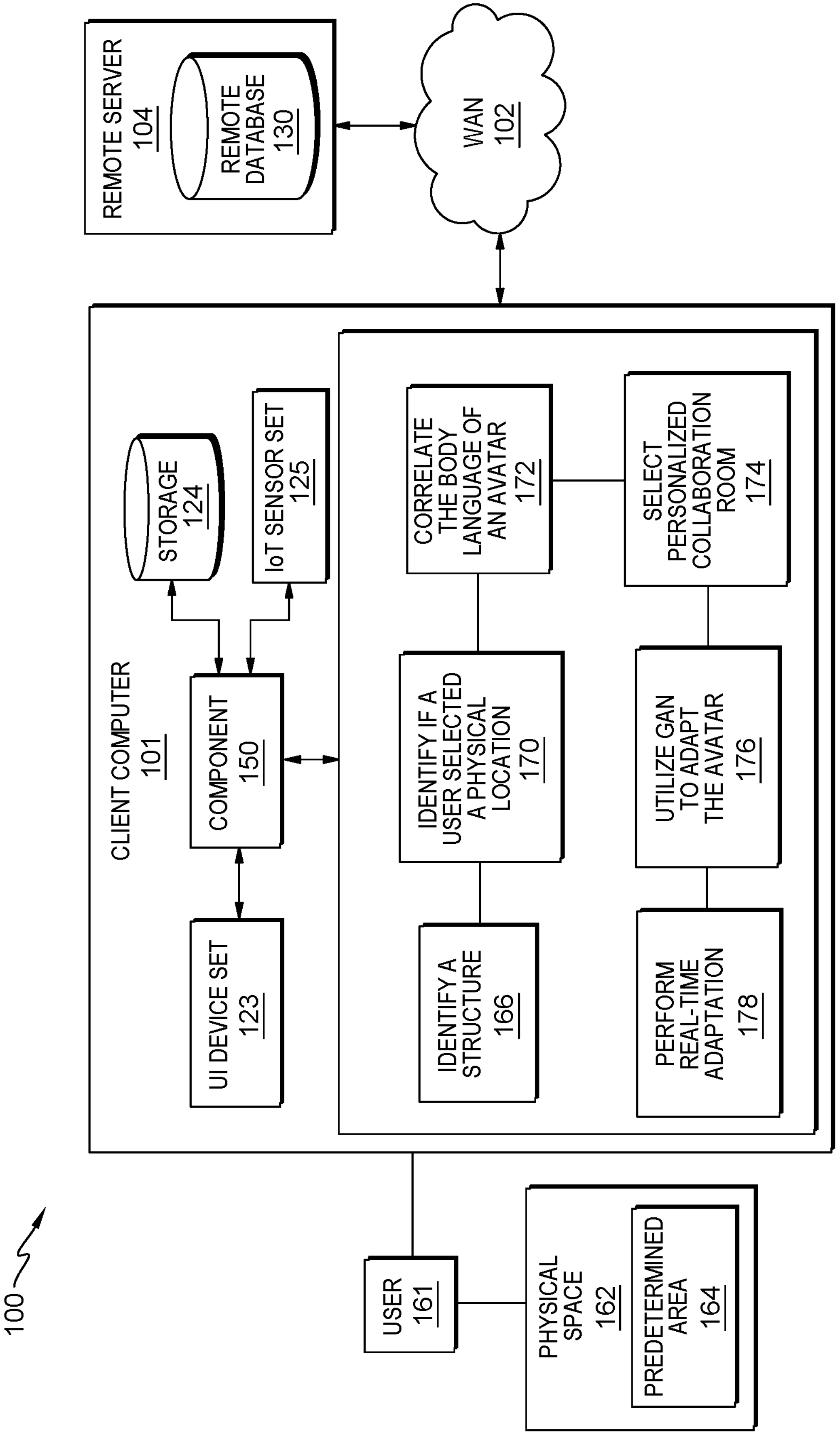
FIG. 1B illustrates a functional block diagram and operational steps of the virtual world collaboration environment program, on a server computer within the distributed data processing environment of FIGS. 1A, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes client computer 101, and remote server 104 interconnected via WAN 102.

In the depicted embodiment, component 150 identifies a structure 166 of a virtual collaboration room, wherein identifying a structure 166 of a virtual collaboration room comprises component 150 utilizing a map of the virtual collaboration room and utilizing real-time video feed, via IoT sensor set 125, and previously collected video and image captures to determine the dimensions and identify the objects in the structure 166 of a virtual collaboration room (e.g., chairs, walls, sections, any obstructions). In various embodiments component 150 identifies a structure 166 of a virtual collaboration room and identifies how one or more of the participants will be placed in a selected virtual world collaboration room. In various embodiments, while attending a virtual world collaboration, each participant may select their own virtual world collaboration room and select the participants to occupy the places within the selected virtual world collaboration room. In various embodiments, while electing a virtual world collaboration room, a user may specify the layout and/or design of the virtual world collaboration room. For example, the user may customize the size, shape, and available features within the virtual world collaboration room. In various embodiments, component 150 may identify how much space is available for each participant and may identify the type of siting arrangement and location of the participants (i.e., avatar of the participants) based on attributes of the collaboration room (e.g., dimension of the collaboration room, number of seats, type of seating, etc.) and individual user's preferences (e.g., preference of where to be placed in a room or meeting and preferred seating position) and user's attributes (e.g., size and height of avatar.

Component 150 may identify how much space is available for each participant and may identify the type of siting arrangement and location of where participants will participant in the virtual world collaboration room (e.g., sitting in a chair around a table where each user is sitting half a meter apart, sitting on floor, standing in a circle, and/or any other type of arrangement known in the art). Component 150 may analyze the three-dimensional (3D) model of the virtual world collaboration room and may identify the positions and placements of the participants within the virtual world collaboration room. In various embodiments, component 150 identifies the number of participants who will participate in the virtual world collaboration and identify if the selected virtual world collaboration room has available places and space for the identified number of participants based on a list of identified participants and a tracking system that identifies, and tracks users as enter and leave the virtual world collaboration room. Component 150 may analyze the selected virtual world collaboration room and identify how different sitting and standing places are present and comparing the identified sitting and standing places and/or arrangements with the available number of participants in the virtual world collaboration. In various embodiments, component 150 identifies the types of sitting and standing places and arrangements in the virtual world collaborative environment and consider the historical data on how different participates have previously occupied the sitting and standing places and arrangements in the virtual world collaborative environment.

In the depicted embodiment, component 150 identifies if a user selected a physical location 170 for the virtual world collaboration. In various embodiments, component 150 determines if the user has selected a physical location (e.g., physical space 162) for virtual world collaboration (e.g., the living room of the user), wherein if it is identified that user has selected physical space 162 then component 150, via the virtual reality (VR) device and/or IoT sensor set 125, identifies the defined physical surrounding (e.g., predetermined area 164) of physical space 162 and creates a 3D model of selected physical space 162 to be utilized as the collaboration room environment. In various embodiments, based on an image analysis (e.g., object-based image analysis) of the physical surrounding, component 150 identifies different sitting and standing location within physical space 162. Component 150 may utilize stored data (e.g., historic data) stored on storage 124 and/or remote database 130 to identify different types of sitting and standing posture in different types of virtual world collaboration room, and based on the type of sitting and standing location in predetermined area 164 within physical space 162 (e.g., identifying participants can sit on chairs, the sofa, on the floor, stand near the window, etc.). In various embodiments, component 150 compares the identified sitting and standing arrangements within physical space 162 to the number of identified participants. In various embodiments, based on the number of identified participants slated to participate in the virtual collaboration room, component 150 identifies if a virtual position will be placed in the physical location in a response to accommodate additional participants due to a lack of space in predetermined area 164.

In the depicted embodiment, component 150 correlates the body language of an avatar 172. In various embodiments, based on historically gathered data associated with utilized virtual world collaborations and virtual world collaboration rooms, and body language performed by different the participants, component 150 creates an AI model that correlates the body language of an avatar with the spoken context of the avatar. Component 150 may monitor the actions of avatars associated with participants while they interact in the virtual world collaboration and collects a dataset of avatar/participant behavior (e.g., body language or a participant and/or avatar of the user). For example, monitoring and collecting body language actions and features of an avatar associated with a participant, such as posture, gestures, facial expressions, arm movement, leg movement, body positions, and correlating the body language with spoken context and/or dialogue. In various embodiments, component 150 retrieve one or more historical datasets that comprise, but not limited to, collected body language or a user and/or avatar, correlated context and dialogue associated with the body language, the virtual world collaboration room, user preferences, user accessibility settings, and/or the position and arrangement of the avatar in the virtual world collaboration room. In various embodiments, the collected and stored data associated with a user and their respective avatar in a range of scenarios and interactions. Component 150 may annotate the collected data by linking the body language features with the spoken context, wherein the annotation may be executed through natural language processing, image capture analysis, an AI system, and motion tracking of captured media (e.g., images and/or video) to create a labelled data set. In some embodiments, component 150 receives manual labelling inputs and utilizes a machine learning engine and machine learning techniques to progressively learn, implement, and apply annotations to captured media (e.g., image and/or video) to create a labelled dataset.

In various embodiments, component 150 extracts relevant features from the labelled dataset, such as, but not limited to, sitting position, the position of limbs, overall body posture, facial expressions, and eye movement of the avatars. Component 150 may utilize computer vision techniques or pose estimation algorithms to capture the body language information from the avatar representations. In various embodiments, component 150 utilizes machine learning techniques to train an AI model that can correlate the extracted body language features with the spoken context. The utilization of machine learning techniques may involve various approaches, such as supervised learning, where the model learns to predict body language based on the spoken context to create an AI model. Based on the creation of the AI model, component may identify which body languages are directly correlated with the spoken context and which body languages can be ignored (i.e., found to be irrelevant such as adjusting a sitting position after a predetermined amount of time).

In the depicted embodiment, component 150 selects a personalized collaboration room 174. In various embodiments, component 150 identifies that a user has selected a personalized collaboration room 174. In various embodiments, component 150 enables each participant participating in the virtual world collaboration to select the type of virtual world collaboration room, the sitting and standing places and arrangement of participants, and any defined physical place, wherein component 150 facilitates the selection of each user so that each user has a personalized virtualized collaboration room running and operating concurrently. In some embodiments, the virtual world collaboration environment is a different virtual world collaboration room for each participant. For example, a first user selects a predetermined office space to be their virtual world collaboration room, and a second user selects their predefined home office to be their virtual world collaboration room, wherein component 150 generates and executes both virtual world collaboration rooms simultaneously so that each user is experiencing the same virtual world collaboration in real-time; however, the virtual world display for the first user is the predetermined office space the virtual world display is the predefined home office space for the second user. In another example, a first user is collaborating in a virtual world environment with a second user. In this example, the first user wishes to collaborate with the second user in the first user's office while the second user will see the first user's avatar in the second user's office, wherein component 150 superimposes the collaboration form the first user to the second user based on the first users preferences. Component 150 may identify the number of participants for the virtual world collaborative environment and may identify the preferences of each identified participant.

Component 150 may identify how different participants are occupying different places in the virtual world collaborative environment (e.g., sitting placement, seating arrangement, avatar placement in the collaboration room, and avatar movements and position in the collaboration room). In various embodiments, component 150 utilizes historical data to identify where to place the participants in the virtual world collaboration room. Component 150 may utilize historical data to identify how each participant occupies the virtual world collaboration room. For example, if a user prefers to participate in virtual world collaborations in the user's office, then based on the user designation (i.e., preference) component 150 superimposes the virtual world collaboration in his office.

In various embodiments, component 150 enables a participant to select how identifies users will be allocated (e.g., standing or seating placement, seating or standing arrangement, etc.) within the virtual world collaboration room. Component 150 may facilitate an option for customization and personalization within the virtual world collaboration rooms or physical locations, wherein the customization and personalization comprise enabling participants to choose collaboration elements. Collaboration elements comprise participant standing or seating placement, seating or standing arrangement, lighting (e.g., brightness and color scheme), time duration, user interaction rules, furniture placement, sound adjustment, presentation rules, and/or focus areas. In various embodiments, component 150 determines if the number of available seating place in the selected physical place is less than the number of identified participants, wherein responsive to identifying the number of available seating places in the selected physical place is less than the number of identified participants, component 150 creates additional virtual sitting places within the virtual representation of the selected physical space by adding seating (chairs, stools, rugs, couches, bleachers) and/or expanding the dimensions of the virtual representation of the selected physical space.

In the depicted embodiment, component 150 utilizes GAN to adapt the avatar 176 of user 161. In various embodiments, component 150 utilizes GAN to adapt the avatar 176 of user 161 to the personalized virtual world collaboration environment, wherein the GAN is executed on client computer 101 or the account of user 161. Component 150 may utilize a GAN to render and display avatars of each participant based the number of identified the number of participants attending the virtual world collaboration environment and the identified virtual world collaboration rooms and/or physical space 162. For example, utilizing a GAN to actively render and display avatars sitting on a chair or standing in a selected personalized virtual world room. In various embodiments, component 150 actively collects data from participants, collects historical datasets from participating avatars in various sitting and standing positions, and collects data corresponding to backgrounds and virtual world room settings, wherein the collected data and datasets are utilized to train a GAN model. Component 150 may perform pre-processing and prepare the dataset by cropping or isolating the avatars and their respective backgrounds and ensure the dataset is organized and labelled to facilitate training.

In various embodiments, component 150 trains a GAN model using the prepared dataset. GANs may consist of a generator network that generates synthetic avatars and one or more classifiers that distinguish between real and generated avatars. Component 150 may train the GAN model to learn the correlation between the avatar's pose and the background or virtual world room using the prepared datasets and/or received data input. In various embodiments, component 150 utilizes the trained GAN model to modify the pose of avatars in the virtual world collaboration room. In various embodiments, component 150 receives as an input an original avatar image and a desired pose (sitting or standing) along with the selected personalized virtual world room, that comprises but is not limited to, sitting places (e.g., sofa, chair, sitting on floor, stadium, auditorium, and bench), standing locations, wherein the GAN model generates a modified avatar image wherein the modified avatar image depicts the avatar as if it is sitting on a chair or standing in the selected virtual world room. Component 150 may perform fine-tuning on the GAN generated avatar image to ensure the virtual rendering of the avatar aligns with the sitting or standing position in the virtual world room and/or is withing a predetermined degree of acceptability, wherein the predetermined degree of acceptability is a predetermined value of predetermined measurements associated with the virtual rendering of the avatar. In various embodiments, component 150 may perform adjustments or refinements to improve the realism and coherence of the modified avatar (i.e., GAN generated avatar).

For example, based on user preferences, if a user is virtually attending a collaboration meeting with a team for a daily meeting, wherein the daily meeting is a stand-up call where the user's avatar is standing while in reality the user is sitting in his workspace attending the daily stand-up meeting. In this scenario, the attributes of the meeting, attributes of the collaboration space and the user's preferences are taken into consideration by the GAN to adapt the avatar, so the avatar is virtually represented standing and functionally active while standing. In this example, if the user cross's their arms and leans back in their chair the GAN will filter out the leaning back and render the avatar as crossing their arms. In various embodiments, component 150 implements real-time adaptation of the avatar based on user input or dynamic changes and enables users to interactively switch between sitting and standing poses or adjust the avatar's position within the virtual world room during the collaboration. Component 150 may collect feedback from users, via client computer 101, associated with the modified avatar's appearance, and user experience, and utilize the feedback to enhance the accuracy, realism, and user satisfaction by executing one or more on the GAN model and pose modification process.

In the depicted embodiment, component 150 performs real-time adaption 178 of the participating avatars. In various embodiments, component 150 performs real-time adaptation 178 of participating avatars to show required body language based on the location of each avatar in each identified virtual world collaboration room (e.g., personalized virtual world collaboration room). Component 150 may perform real-time adaption 178 of the participating avatars by (i) performing a translation of body gestures from the physical world to the virtual world, wherein the translation occurs "as is" or is adapted based on social requirements and other attributes of the virtual collaboration environment, and/or (ii) automatically creating gestures based on the context of the collaboration content (e.g. a head nod)

Component 150 may identify each participating avatar and their position on each of the different personalized virtual world collaboration rooms and identify how different participants are interacting in the virtual world collaboration room. Component 150 may track the position and movement of each participating avatar within the personalized virtual world collaboration room, via IoT sensor set 125 a computing vision system and/or received feed from the respective participants. In various embodiments, based on the context of the virtual world collaboration context, and the spoken content by any participant, component 150 identifies which body languages are to be shown and which body language are to be ignored based on the position of the avatar in different personalized virtual world collaborative room. Component 150 may continuously process the position tracking data and analyze the location of each avatar within the virtual world collaboration room and determine the specific location-based body language rule that applies to each avatar based on their position. Component 150 may dynamically modify, by the GAN, the body language of each avatar in real-time to align with the required body language based on their location, wherein the dynamic modification comprises, but is not limited to, adjusting the avatar's posture, gestures, or other relevant body language cues.

Figure 2:
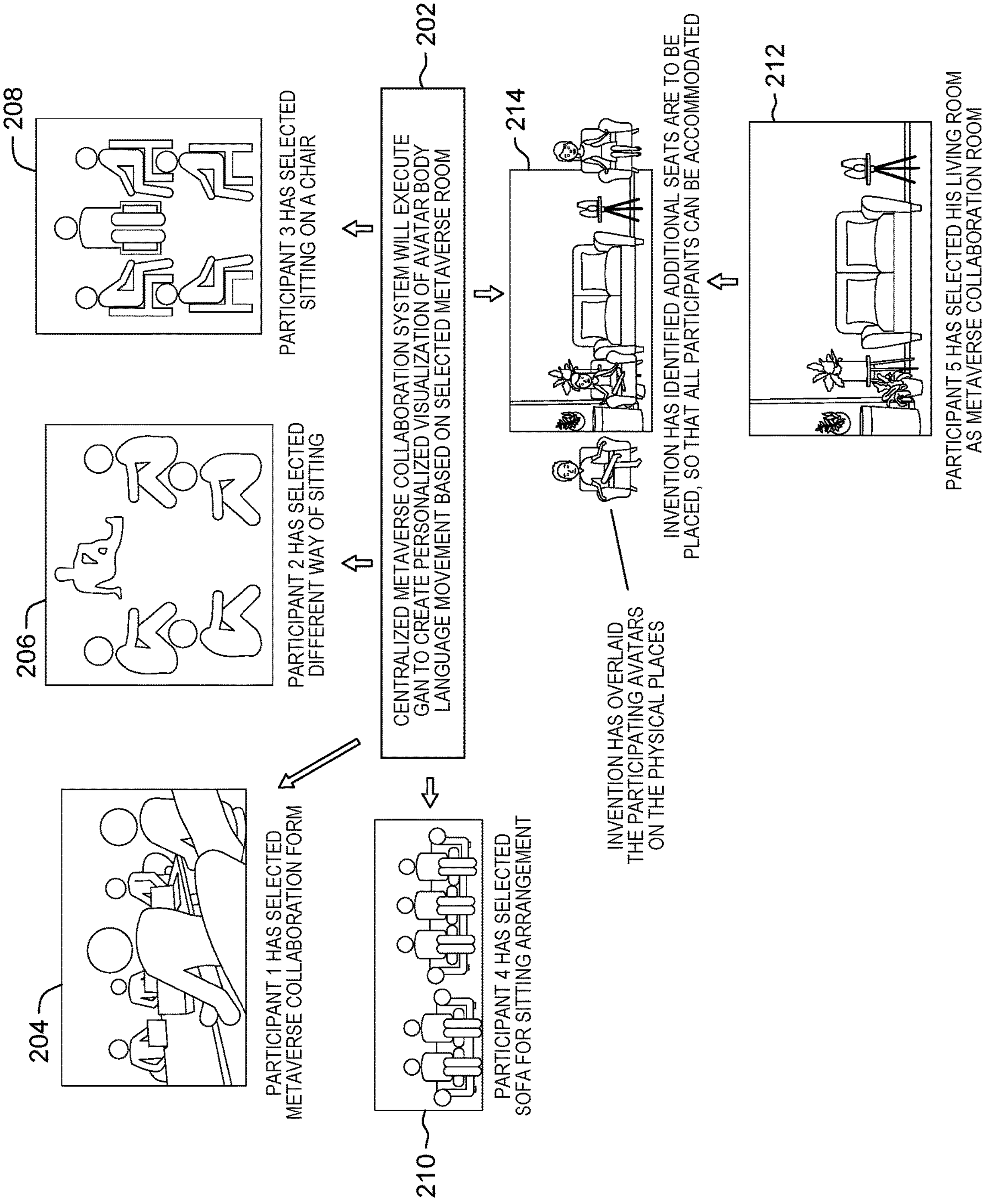
FIG. 2 is a functional block diagram illustrating a distributed data processing environment in accordance with an embodiment of the present invention.

FIG. 2 is a functional block diagram illustrating one embodiment of the present invention. FIG. 2 provides one example of multiple participants attending a virtual world collaboration event where different participants can make their virtual world room in a personalized manner, and accordingly GAN may be utilized for adapting the participating avatars based on the selected personalized virtual world room for different participants (i.e., users), wherein each personalized virtual world room is uniquely displayed for each participant based on the participants selections. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, component 150 (e.g., centralized virtual world collaboration system) executes GAN 202 to create personalized visualization of avatar body movement (e.g., language movement) and placement of the avatar within the virtual collaboration room based on the selected virtual world collaboration rooms. In the depicted embodiment, a first participant selects a predetermined virtual world collaboration room 204 (e.g., predetermined meeting room), wherein component 150, via GAN 202, generates the avatars of each participant and places the avatars of each participant siting in offices chairs around the conference table. In the depicted embodiment, a second participant selected that each participant sits on the floor 206, wherein component 150, via GAN 202, generates the avatars of each participant and places the avatars of each participant siting on the floor in a circle. In the depicted embodiment, a third participant selected that each participant sits in a chair 208, wherein component 150, via GAN 202, generates the avatars of each participant and places the avatars of each participant siting in chairs in a circle. In the depicted embodiment, a fourth participant selected that each participant sits on a sofa 210 in a predetermine sofa arrangement, wherein component 150, via GAN 202, generates the avatars of each participant and places the avatars of each participant siting on sofas in a predetermined sofa arrangement.

In the depicted embodiment, a fifth participant selected their physical living room as the virtual world collaboration environment 212. In the depicted environment, component 150, via the virtual reality (VR) device and/or an IoT sensor set, identifies the defined physical surrounding of a physical space (e.g., the living room of the fifth participant) and creates a 3D model of the living room of the fifth participant. In various embodiments, based on an image analysis (e.g., object-based image analysis) of the living room of the fifth participant, component 150 identifies different sitting and standing location within the living room. In this example, component 150 identifies that there are five participants but the living room of the fifth participant only has two seats on an identified sofa. In the depicted embodiment, component 150 identifies additionally seats need to be placed 214 in the living room to accommodate all five participants. In the depicted embodiment, component 150, via GAN 202, alters the virtual 3D model of the living room of the fifth participant to include three more living room seating chairs and over lays the participating avatars on each of the five available seats in the living room. In various embodiments, each virtual display of the virtual world collaboration room is unique to each participant based on the selected personalization and preferences of each participant. For example, the first participant, via a virtual reality headset, sees and experiences the virtual world collaboration room as an office room meeting, whereas the second participant sees and experiences the same virtual world collaboration room as the participants sit on the floor in a circle.

Figure 3:
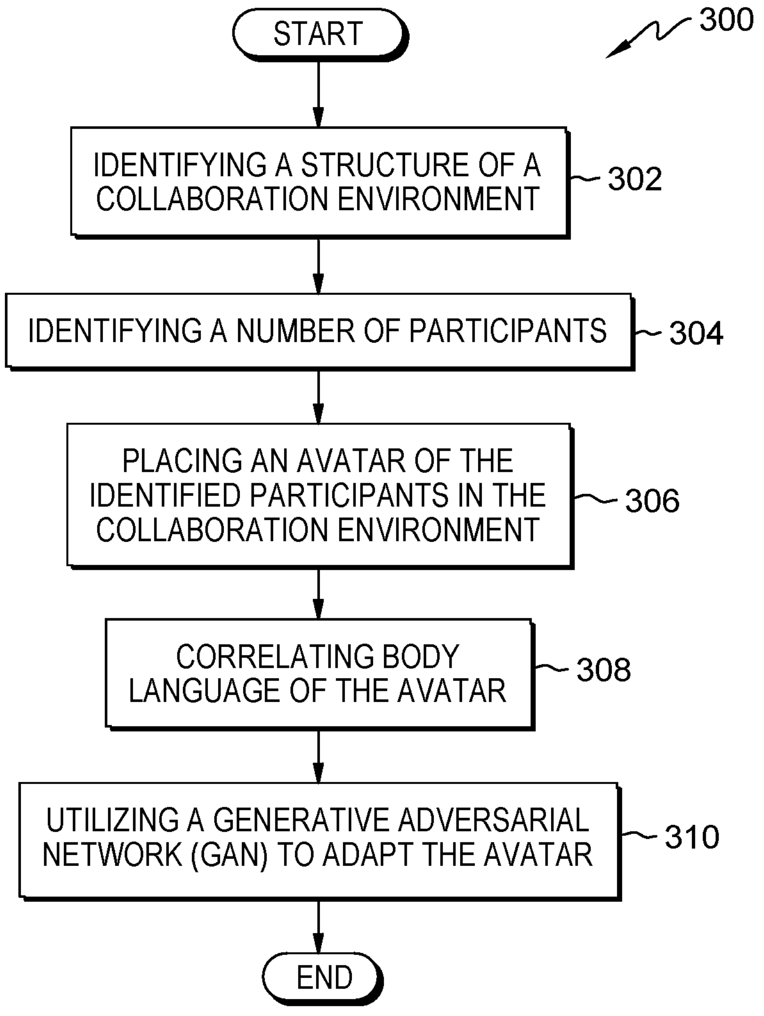
FIG. 3 illustrates operational steps of the virtual world collaboration environment program, on a server computer within the distributed data processing environment of FIGS. 1A, in accordance with an embodiment of the present invention.

FIG. 3 illustrates operational steps of component 150, generally designated 300, in communication with client computer 101, remote server 104, private cloud 106, EUD 103, client computer 101, and/or public cloud 105, within distributed data processing environment 100, for dynamic adaptation of avatars in a personalized virtual world environment, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In block 302, component 150 identifies a structure of a collaboration environment. In various embodiments component 150 identifies a structure of a virtual collaboration room and identifies how one or more of the participants will be placed in a selected virtual world collaboration room. In various embodiments, while attending a virtual world collaboration, each participant may select their own virtual world collaboration room and select the location of where participants will be placed within the selected virtual world collaboration room. In various embodiments, while electing a virtual world collaboration room, a user may specify the layout and/or design of the virtual world collaboration room. For example, the user may customize the size, shape, and available features within the virtual world collaboration room.

In block 304, component 150 identifies the number of participants. In various embodiments, component 150 identifies the number of participants who will participate in the virtual world collaboration and identifies if the selected virtual world collaboration room has available places and space for the identified number of participants.

In block 306, component 150 places an avatar of the identified participants in the collaboration environment. Component 150 may identify how different participants are occupying different places in the virtual world collaborative environment (e.g., sitting placement, seating arrangement, avatar placement in the collaboration room, and avatar movements and position in the collaboration room) and places the avatar of the participant by virtually rendering the participants avatar in the identified location, via GAN. In various embodiments, component 150 utilizes historical data to identify where to place the participants in the virtual world collaboration room and places the avatar of the participant by virtually rendering the participants avatar in the identified location, via GAN. Component 150 may utilize historical data to identify how each participant occupies the virtual world collaboration room. In various embodiments, component 150 enables a participant to select how identifies users will be allocated (e.g., standing or seating placement, seating or standing arrangement, etc.) within the virtual world collaboration room.

In block 308, component 150 correlates body language of the avatar. In the depicted embodiment, component 150 correlates the body language of the avatar. In various embodiments, based on historically gathered data associated with utilized virtual world collaborations and virtual world collaboration rooms, and body language performed by different the participants, component 150 creates an AI model that correlates the body language of an avatar with the spoken context of the avatar. Component 150 may monitor and collect, by an IoT sensor set, data associated the actions of avatars associated with participants while they interact in the virtual world collaboration and collects a dataset of avatar/participant behavior (e.g., body language or a participant and/or avatar of the user). For example, monitoring and collecting body language actions and features of an avatar associated with a participant, such as posture, gestures, facial expressions, arm movement, leg movement, body positions, and correlating the body language with spoken context and/or dialogue. In various embodiments, component 150 retrieve one or more historical datasets that comprise, but not limited to, collected body language or a user and/or avatar, correlated context and dialogue associated with the body language, the virtual world collaboration room, user preferences, user accessibility settings, and/or the position and arrangement of the avatar in the virtual world collaboration room. In various embodiments, the collected and stored data associated with a user and their respective avatar in a range of scenarios and interactions. Component 150 may annotate the collected data by linking the body language features with the spoken context, wherein the annotation may be executed through natural language processing, image capture analysis, an AI system, and motion tracking of captured media (e.g., images and/or video) to create a labelled data set. In some embodiments, component 150 receives manual labelling inputs and utilizes a machine learning engine and machine learning techniques to progressively learn, implement, and apply annotations to captured media (e.g., image and/or video) to create a labelled dataset.

In block 310, component 150 utilizes a GAN to adapt the avatar. In various embodiments, component 150 utilizes GAN to adapt the avatar of the participant to the personalized virtual world collaboration environment, wherein the GAN is executed on a client computer or the account of the participant. Component 150 may utilize a GAN to render and display avatars of each participant based the number of identified the number of participants attending the virtual world collaboration environment and the identified virtual world collaboration rooms and/or physical space 162. For example, utilizing a GAN to actively render and display avatars sitting on a chair or standing in a selected personalized virtual world room. In various embodiments, component 150 performs real-time adaptation 178 of participating avatars to show required body language based on the location of each avatar in each identified virtual world collaboration room (e.g., personalized virtual world collaboration room). Component 150 may identify each participating avatar and their position on each of the different personalized virtual world collaboration rooms and identify how different participants are interacting in the virtual world collaboration room. Component 150 may track the position and movement of each participating avatar within the personalized virtual world collaboration room, via IoT sensor set 125 a computing vision system and/or received feed from the respective participants. In various embodiments, based on the context of the virtual world collaboration context, and the spoken content by any participant, component 150 identifies which body languages are to be shown and which body language are to be ignored based on the position of the avatar in different personalized virtual world collaborative room. Component 150 may continuously process the position tracking data and analyze the location of each avatar within the virtual world collaboration room and determine the specific location-based body language rule that applies to each avatar based on their position. Component 150 may dynamically modify the body language of each avatar in real-time to align with the required body language based on their location, wherein the dynamic modification comprises, but is not limited to, adjusting the avatar's posture, gestures, or other relevant body language cues.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

identifying, by a client computer, a structure of a virtual world collaboration room and a placement of participants in the virtual world collaboration room;

correlating, by an internet of things (IoT) sensor set, body language of an avatar to match a spoken context of the avatar;

selecting the virtual world collaboration room or a predetermined physical location to conduct a virtual world collaboration, wherein the virtual world collaboration room is personalized;

utilizing a generative adversarial network (GAN) to adapt the avatar to the virtual world collaborative environment; and performing real-time adaptation, by the GAN, of the avatar participating in the virtual world collaboration room to generate and output a required body language for the avatar participating in the virtual world collaboration room based on movement of a user, wherein performing the real-time adaptation further comprises applying a set of location-dependent body-language rules that vary per personalized virtual world collaboration room, such that the generated body language for the avatar is conditioned on the position of the avatar and context within a first room differs from the rooms experienced by other participants.

2. The computer-implemented method of claim 1, further comprising:

identifying a physical location for the virtual world collaboration room has been selected;

analyzing the selected virtual world collaboration room by individual users and the physical location;

identifying a type of sitting or standing posture in different locations within the virtual world collaboration room for the avatars participating in the virtual world collaboration, and utilizing the GAN to modify an appearance of each of the participating avatars for each of virtual world collaboration room associated with the participants; and identifying portions of the avatars body that is not required to demonstrate the body language and portions of the avatar body required to emulate the body language.

3. The computer-implemented method of claim 1, wherein identifying the structure of the virtual world collaboration room and the placement of the participants in the virtual world collaboration room further comprises:

analyzing a three-dimensional model of the virtual world collaboration room;

identifying positions and placements of the participants within the virtual world collaboration room based on hierarchy, seating arrangements, role of the participants, preferences, visibility, proximity, and accessibility for effective collaboration;

identifying types of sitting and standing places in the virtual world collaborative room; and considering historical data on how different participates are occupying those sitting and standing places.

4. The computer-implemented method of claim 1, wherein correlating of the body language of the avatar to match the spoken context of the avatar further comprises:

creating an artificial intelligent (AI) model that correlates the body language of the avatar with the spoken context of the avatar based on historically gather information from different types of virtual world collaborations and body language performed by different participants; and gathering one or more datasets of historical data that comprise body language features of the avatars and a corresponding spoken context or dialogue, wherein the data encompasses a range of scenarios and interactions, and wherein the includes body language features of the avatars comprises posture, gestures, and facial expressions.

5. The computer-implemented method of claim 1, wherein utilizing the GAN to adapt the avatar to the personalized virtual world collaborative environment further comprises:

identifying a number of participants attending in one or more virtual world collaboration environments;

displaying, by the GAN, the avatar sitting or standing in a selected personalized virtual world room;

collecting datasets of the avatars participating in the virtual world collaboration room in various sitting and standing positions, and corresponding backgrounds or virtual world room settings, wherein the datasets are utilized to train a GAN model; and performing pre-process and prepare the dataset by cropping or isolating the avatars and their respective backgrounds.

6. The computer-implemented method of claim 5, further comprising:

annotating the collected datasets by linking features of the body language with the spoken context;

extracting relevant features from the annotated datasets, wherein the relevant features comprise position of limbs and overall body posture of the avatars, and wherein extracting comprises:

utilizing computer vision techniques or pose estimation algorithms to capture data associated with the body language from representations from the avatar; and utilizing machine learning techniques to train an AI model that can correlate the extracted features of the body language with the spoken context.

7. The computer-implemented method of claim 5, further comprising:

training the GAN model using the prepared dataset, wherein the GAN model comprises a generator network that generates synthetic avatars and a network that distinguishes between real and generated avatars;

utilizing the trained GAN model to modify the pose of the avatar;

fine-tuning the generated avatar image to ensure the avatar aligns with an assigned seating or standing position in the virtual world collaboration room; and implementing real-time adaptation of the avatar based on user input or dynamic changes.

8. A computer system comprising:

one or more computer processors;

one or more computer readable storage devices;

program instructions to identify, by a client computer, a structure of a virtual world collaboration room and a placement of participants in the virtual world collaboration room;

program instructions to correlate, by an internet of things (IOT) sensor set, body language of an avatar to match a spoken context of the avatar;

program instructions to select the virtual world collaboration room or a predetermined physical location to conduct a virtual world collaboration, wherein the virtual world collaboration room is personalized;

program instructions to utilize a generative adversarial network (GAN) to adapt the avatar to the virtual world collaborative environment; and program instructions to perform real-time adaptation, by the GAN, of the avatar participating in the virtual world collaboration room to generate and output a required body language for the avatar participating in the virtual world collaboration room based on movement of a user, wherein performing the real-time adaptation further comprises applying a set of location-dependent body-language rules that vary per personalized virtual world collaboration room, such that the generated body language for the avatar is conditioned on the position of the avatar and context within a first room differs from the rooms experienced by other participants.

9. The computer system of claim 8, further comprising:

program instructions to identify a physical location for the virtual world collaboration room has been selected;

program instructions to analyze the selected virtual world collaboration room by individual users and the physical location;

program instructions to identify a type of sitting or standing posture in different locations within the virtual world collaboration room for the avatars participating in the virtual world collaboration, and utilizing the GAN to modify an appearance of each of the participating avatars for each of virtual world collaboration room associated with the participants; and program instructions to identify portions of the avatars body that is not required to demonstrate the body language and portions of the avatar body required to emulate the body language.

10. The computer system of claim 8, wherein identifying the structure of the virtual world collaboration room and the placement of the participants in the virtual world collaboration room further comprises:

program instructions to analyze a three-dimensional model of the virtual world collaboration room;

program instructions to identify positions and placements of the participants within the virtual world collaboration room based on hierarchy, seating arrangements, role of the participants, preferences, visibility, proximity, and accessibility for effective collaboration;

program instructions to identify types of sitting and standing places in the virtual world collaborative room; and program instructions to consider historical data on how different participates are occupying those sitting and standing places.

11. The computer system of claim 8, wherein correlating of the body language of the avatar to match the spoken context of the avatar further comprises:

program instructions to create an artificial intelligent (AI) model that correlates the body language of the avatar with the spoken context of the avatar based on historically gather information from different types of virtual world collaborations and body language performed by different participants; and program instructions to gather one or more datasets of historical data that comprise body language features of the avatars and a corresponding spoken context or dialogue, wherein the data encompasses a range of scenarios and interactions, and wherein the includes body language features of the avatars comprises posture, gestures, and facial expressions.

12. The computer system of claim 8, wherein utilizing the GAN to adapt the avatar to the personalized virtual world collaborative environment further comprises:

program instructions to identify a number of participants attending in one or more virtual world collaboration environments;

program instructions to display, by the GAN, the avatar sitting or standing in a selected personalized virtual world room;

program instructions to collect datasets of participating avatars in various sitting and standing positions, and corresponding backgrounds or virtual world room settings, wherein the datasets are utilized to train a GAN model; and program instructions to perform pre-process and prepare the dataset by cropping or isolating the avatars and their respective backgrounds.

13. The computer system of claim 12, further comprising:

program instructions to annotate the collected datasets by linking features of the body language with the spoken context;

program instructions to extract relevant features from the annotated datasets, wherein the relevant features comprise position of limbs and overall body posture of the avatars, and wherein extracting comprises:

program instructions to utilize computer vision techniques or pose estimation algorithms to capture data associated with the body language from representations from the avatar; and program instructions to utilize machine learning techniques to train an AI model that can correlate the extracted features of the body language with the spoken context.

14. The computer system of claim 12, further comprising:

program instructions to train the GAN model using the prepared dataset, wherein the GAN model comprises a generator network that generates synthetic avatars and a network that distinguishes between real and generated avatars;

program instructions to utilize the trained GAN model to modify the pose of the avatar;

fine-tuning the generated avatar image to ensure the avatar aligns with an assigned seating or standing position in the virtual world collaboration room; and program instructions to implement real-time adaptation of the avatar based on user input or dynamic changes.

15. A computer program product comprising:

one or more computer readable storage devices and program instructions stored on the one or more computer readable storage devices, the stored program instructions comprising:

program instructions to identify, by a client computer, a structure of a virtual world collaboration room and a placement of participants in the virtual world collaboration room;

program instructions to correlate, by an internet of things (IoT) sensor set, body language of an avatar to match a spoken context of the avatar;

program instructions to select the virtual world collaboration room or a predetermined physical location to conduct a virtual world collaboration, wherein the virtual world collaboration room is personalized;

program instructions to utilize a generative adversarial network (GAN) to adapt the avatar to the virtual world collaborative environment; and program instructions to perform real-time adaptation, by the GAN, of the avatar participating in the virtual world collaboration room to generate and output a required body language for the avatar participating in the virtual world collaboration room based on movement of a user, wherein performing the real-time adaptation further comprises applying a set of location-dependent body-language rules that vary per personalized virtual world collaboration room, such that the generated body language for the avatar is conditioned on the position of the avatar and context within a first room differs from the rooms experienced by other participants.

16. The computer program product of claim 15, further comprising:

program instructions to identify a physical location for the virtual world collaboration room has been selected;

program instructions to analyze the selected virtual world collaboration room by individual users and the physical location;

program instructions to identify a type of sitting or standing posture in different locations within the virtual world collaboration room for the avatars participating in the virtual world collaboration, and utilizing the GAN to modify an appearance of each of the participating avatars for each of virtual world collaboration room associated with the participants; and program instructions to identify portions of the avatars body that is not required to demonstrate the body language and portions of the avatar body required to emulate the body language.

17. The computer program product of claim 15, wherein identifying the structure of the virtual world collaboration room and the placement of the participants in the virtual world collaboration room further comprises:

program instructions to analyze a three-dimensional model of the virtual world collaboration room;

program instructions to identify positions and placements of the participants within the virtual world collaboration room based on hierarchy, seating arrangements, role of the participants, preferences, visibility, proximity, and accessibility for effective collaboration;

program instructions to identify types of sitting and standing places in the virtual world collaborative room; and program instructions to consider historical data on how different participates are occupying those sitting and standing places.

18. The computer program product of claim 15, wherein correlating of the body language of the avatar to match the spoken context of the avatar further comprises:

program instructions to create an artificial intelligent (AI) model that correlates the body language of the avatar with the spoken context of the avatar based on historically gather information from different types of virtual world collaborations and body language performed by different participants; and program instructions to gather one or more datasets of historical data that comprise body language features of the avatars and a corresponding spoken context or dialogue, wherein the data encompasses a range of scenarios and interactions, and wherein the includes body language features of the avatars comprises posture, gestures, and facial expressions.

19. The computer program product of claim 15, wherein utilizing the GAN to adapt the avatar to the personalized virtual world collaborative environment further comprises:

program instructions to identify a number of participants attending in one or more virtual world collaboration environments;

program instructions to display, by the GAN, the avatar sitting or standing in a selected personalized virtual world room;

program instructions to collect datasets of participating avatars in various sitting and standing positions, and corresponding backgrounds or virtual world room settings, wherein the datasets are utilized to train a GAN model; and program instructions to perform pre-process and prepare the dataset by cropping or isolating the avatars and their respective backgrounds;

program instructions to annotate the collected datasets by linking features of the body language with the spoken context;

program instructions to extract relevant features from the annotated datasets, wherein the relevant features comprise position of limbs and overall body posture of the avatars, and wherein extracting comprises:

program instructions to utilize computer vision techniques or pose estimation algorithms to capture data associated with the body language from representations from the avatar; and program instructions to utilize machine learning techniques to train an AI model that can correlate the extracted features of the body language with the spoken context.

20. The computer program product of claim 19, further comprising:

program instructions to train the GAN model using the prepared dataset, wherein the GAN model comprises a generator network that generates synthetic avatars and a network that distinguishes between real and generated avatars;

program instructions to utilize the trained GAN model to modify the pose of the avatar; fine-tuning the generated avatar image to ensure the avatar aligns with an assigned seating or standing position in the virtual world collaboration room; and program instructions to implement real-time adaptation of the avatar based on user input or dynamic changes.

* * * * *